United States Patent [19]

Zaugg

[11] Patent Number: 5,757,684

[45] Date of Patent: May 26, 1998

[54] ADAPTIVE CO-CHANNEL INTERFERENCE CANCELER USING SPECTRAL SYMMETRY

[75] Inventor: Thomas C. Zaugg, Tucson, Ariz.

[73] Assignee: Rincon Research Corporation, Tucson, Ariz.

[21] Appl. No.: 560,036

[22] Filed: Nov. 17, 1995

[51] Int. Cl.$^6$ .................................................. G06F 17/10
[52] U.S. Cl. ....................................................... 364/724.19
[58] Field of Search ........................... 364/724.19, 724.18; 375/350

[56] References Cited

U.S. PATENT DOCUMENTS

| | | | |
|---|---|---|---|
| 4,287,475 | 9/1981 | Eaton et al. | 364/825 |
| 4,882,668 | 11/1989 | Schmid et al. | 364/600 |
| 5,159,709 | 10/1992 | Hansen | 455/266 |
| 5,307,517 | 4/1994 | Rich | 455/324 |
| 5,416,845 | 5/1995 | Shen | 381/71 |
| 5,502,747 | 3/1996 | McGrath | 364/724.19 |

OTHER PUBLICATIONS

Openheim and Schafer, "Digital Signal Processing," 1975, pp. 110–115.

*Primary Examiner*—Tan V. Mai
*Attorney, Agent, or Firm*—Antonio R. Durando

[57] ABSTRACT

A co-channel interference canceling system that uses adaptive filters exploiting the short-term spectral symmetry of narrow-band FM signals. The carrier frequency of a signal-of-interest is designated. An adaptive filter is generated that passes those spectral components that exhibit symmetry about this center-point frequency, and attenuates those that do not. Co-channel interferers detuned from the SOI are significantly attenuated, greatly improving the reception of the signal of interest.

29 Claims, 6 Drawing Sheets

ADAPTIVE CO-CHANNEL INTERFERENCE CANCELER USING SPECTRAL SYMMETRY

BACKGROUND OF THE INVENTION

1. Field of the Invention

This invention pertains in general to the field of digital signal processing and, more specifically, to the field of adaptive filtering. The adaptive filter of the invention is particularly but not exclusively applicable to telecommunication systems.

2. Description of the Prior Art

The problem of co-channel interference in communication systems can occur whenever a plurality of signals occupy a common bandwidth in such a way that the signals overlap both temporally and spectrally from the point of view of the receiver. When the power of one or more interfering signals, as measured at the receiver, is comparable to or greater than the received power of the signal-of-interest (SOI), the ability of a demodulator to demodulate the SOI may be seriously degraded, at times to the point where demodulation becomes impossible. This condition may occur for many classes of signals using either analog of digital modulation schemes.

Adaptive filtering techniques have long been used to improve signal quality. A principle challenge in developing an adaptive filtering technique is finding ways to identify which contributions to the received signal come from the SOI and which contributions come from the interferers.

Some approaches attempt to preserve (or impose) some identifiable signal property, such as constant modulus for FM signals. In such schemes, the interference is identified as the contribution to the received signal which causes perturbations in the property that is to be preserved. A filter is devised so as to reduce such contributions. The filter is continually or periodically updated as required to preserve as best as possible the signal property. While effective in many situations, particularly against single interferers, these methods have not generally been as successful against multiple interferers where it is usually no longer a simple matter to deduce the nature of the interference from perturbations of the chosen property.

Another approach identifies interfering signal carriers and employs tunable notch filters to remove them. An example of such a system is disclosed in U.S. Pat. No. 5,307,517 issued to Rich. Although such methods are successful in removing the power associated with the interfering carriers, and consequently improving the reception of the SOI, they do not remove the power associated with the sidebands of the interferers. Therefore, substantial interference may remain, particularly in many digital modulation schemes where the carrier is suppressed altogether. Against this type of interference, carrier notching is essentially useless.

An FM receiver disclosed in U.S. Pat. No. 5,159,709 issued to Hansen employs a bandpass filter with variable center frequency. The center frequency of the filter is varied depending on the received signal. The pass band is then limited to a narrow region symmetric about the instantaneous carrier frequency. The interfering power outside of this region is effectively removed. For this technique to be effective, however, the SOI must be the dominant signal in the band. This type of filter is really more effective for reducing noise-like interference rather than interfering signals.

Another class of prior art-techniques for canceling interfering signals takes advantage of the framing structure and redundancies in certain digital modulation schemes. Often the dominant signal can be demodulated when the redundancies are exploited to full extent. This dominant signal is then re-modulated and subtracted from the received signal. Once this signal has been removed, the next dominant signal can be demodulated and removed in like manner. This process is repeated for each co-channel signal. Such demod-remod techniques are typically limited to just a few interferers of the same type as the SOI.

A mathematical analysis of double sideband AM signals shows that the power spectrum of the modulated signal is symmetric about the carrier frequency. It can also be shown that FM signals of low modulation index exhibit a high degree of spectral symmetry about the nominal carrier frequency. What is not obvious from a simple mathematical analysis, but has been verified in practice and is the basis of the present invention, is that the short-term power spectra of FM signals of higher modulation indices, such as those typically used in communication systems, also exhibit a high degree of spectral symmetry about the carrier. This observation suggests a means for identifying which contributions to the received signal come from the SOI and which contributions come from the interferers. That is, the contributions from the SOI result in spectral components which are symmetric about the SOI carrier frequency whereas the contributions from the interferers result in spectral components which are not in general symmetric about the SOI carrier.

The idea of taking advantage of the fact that the short-term power spectra of a signal of interest will exhibit substantial symmetry about the nominal carrier frequency whereas the power spectra of interfering signals will not in general exhibit symmetry about that same center-point frequency in order to construct an adaptive filter to reduce the interference has not been seen in the prior art despite many years of research into finding solutions to the co-channel interference problem. The invention herein disclosed is a practical implementation of an adaptive filter based on this concept.

BRIEF SUMMARY OF THE INVENTION

A primary objective of this invention is to improve the quality of a signal of interest which has been corrupted by the simultaneous reception of co-channel interference by taking advantage of the fact that the short-term power spectra of many types of communication signals, including double sideband AM and nearly all FM and PM signals, exhibit a high degree of symmetry about the nominal carrier frequency of the signal.

Two fundamental strategies are adopted in order to accomplish this objective. The first strategy takes advantage of the symmetry properties of the spectra of a signal of interest about the SOI carrier frequency to create a filter designed to pass primarily the components of the SOI while attenuating all other components. The second strategy takes advantage of the symmetry properties of the spectra of an interferer about its carrier frequency to create a filter designed to attenuate the components of the interferer while passing all other components. These strategies can be combined to create a filter that takes advantage of the symmetry properties of the SOI as well as one or more of the interferers such that the components of the SOI are passed while components of the interferers are more completely attenuated.

The class of filters employing the first strategy shall be designated as symmetry-passing filters. The class of filters employing the second strategy shall be designated as symmetry-rejecting filters. The cascade of a symmetry-passing filter with one or more symmetry-rejecting filters shall be referred to as a composite filter.

In order to create either class of adaptive filter, a series of short-term power spectra must be generated from the IF input channel at the adaptation rate. For a symmetry-passing filter, the IF SOI carrier frequency must be designated, whereas for a symmetry-rejecting filter the IF carrier frequency of the interferer must be designated. Regardless of the type of filter, the carrier frequency used will be referred to as the center-point frequency of the filter. The carrier frequency of a received signal is not always fixed but may drift over time. This effect is apparent when there are Doppler shifts due to relative motion between the receiver and the transmitter, or when a thermally unstable oscillator is used as a frequency reference. This situation may be accommodated by adding a frequency tracking mechanism that updates the center-point frequency of the filter at the adaptation rate.

The frequency domain coefficients of the filter are recomputed at the adaptation rate based on the power spectrum and center-point frequency. For every spectral element on one side of the center-point frequency there is a corresponding spectral element the same distance from the center-point frequency but on the opposite side. This other spectral element will be referred to as the mirror element of the original element. The value of the filter coefficient at a particular frequency can be generated as a function of the small group of power spectral elements immediately surrounding that frequency and their mirror elements. For example, the coefficients of a symmetry-passing filter which imposes symmetry on the filtered power spectrum can be generated by assigning the coefficient a value of 1 if the corresponding spectral element is smaller than its mirror element and assigning it a value equal to the square root of the ratio (smallest to largest) of the two elements if it is not. Note that the filter itself is not symmetric; rather, the effect of the filter is to impose symmetry on the power spectrum. Once the filter coefficients have been generated in the frequency domain, they may be transformed into the tap-weights of a time-domain filter, or they may be applied directly to the signal in the frequency domain as will be discussed in description of the preferred embodiment.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The heart of this invention lies in the realization that the short-term power spectra of many types of modern communication signals exhibit a high degree of spectral symmetry about the nominal carrier frequency and that this property can be advantageously exploited to create an adaptive filter that tends to pass a designated signal of interest while attenuating interfering signals. Referring to the drawings, wherein like reference numerals and symbols are used for like parts, FIG. 1. is a general block-diagram representation of the preferred embodiment 100 of the invention.

Figure 1:
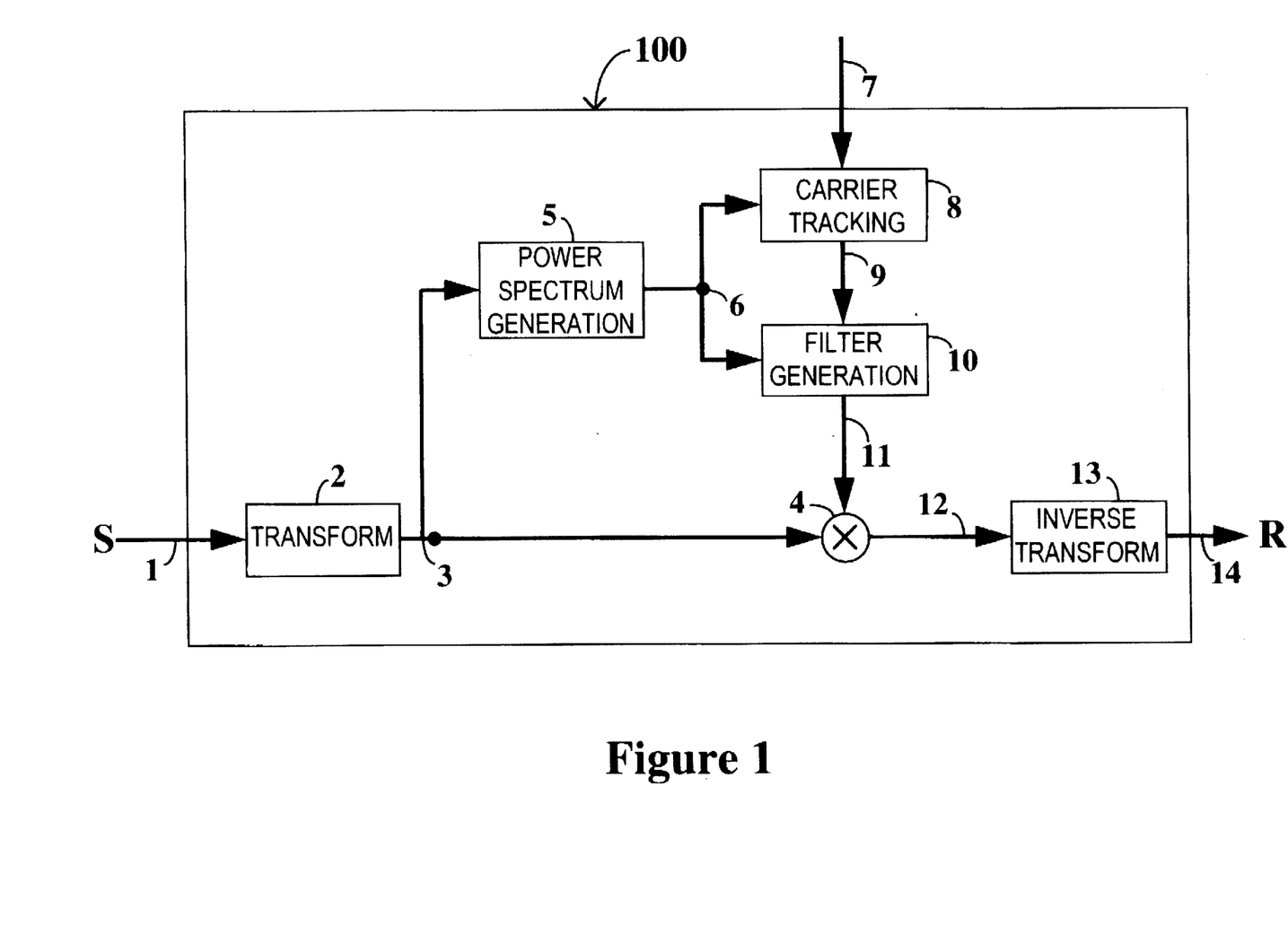
FIG. 1 is a block diagram of the preferred embodiment of a general implementation of the invention.

The embodiment 100 of the invention is based on the well known overlap-save method (see "Digital Signal Processing," Openheim and Schafer, Prentice-Hall Publisher, N.J., 1975, pp. 110–115) of linear filtering with the modification that the filter is updated for each processing block. It is assumed that prior to entering the input terminal 1 the received RF signal has been frequency translated to a convenient IF and digitally sampled, resulting in the sampled signal S. The samples of S at 1 may be real or complex. If the input is real, the maximum IF bandwidth is half the sample rate with the IF band center at one fourth the sample rate. If the input is complex, the maximum IF bandwidth is equal to the sample rate and the band center is at zero.

A characteristic of block processing methods, such as the overlap-save method, is that the input signal is partitioned into blocks of data in the time domain. Each of these blocks of data is transformed to the frequency domain. To maintain a consistent terminology I will refer to the transformed blocks as frames of spectral data. There is a one-to-one correspondence between blocks of time domain data and frames of frequency domain spectra. Two types of spectra will be referred to, amplitude spectra and power spectra. The power spectra are simply the magnitude square, element by element, of the amplitude spectra. Hence any function of the elements of the power spectra may, by extension, be considered a function of the elements of the amplitude spectra with no loss of generality. As is common in the art, the elements of a spectral frame may be referred to as frequency bins.

Within the transform computation unit 2 the input samples S are partitioned into a series of overlapping blocks of data. Each data block is multiplied by a windowing function, such as a Hanning window, and then transformed via Fast Fourier Transform (FFT) to the frequency domain. Of course, the degenerate case of the unit window is the same as no window at all. The output 3 from the transform computation unit 2 consists of a series of frames of amplitude spectra, one frame for each data block. A corresponding series of frames of power spectra 6 is generated by successively squaring the magnitude of the frames of amplitude spectra, element by element, in the power spectra generation unit 5.

The center-point frequency of the filter is designated via input terminal 7. A signal tracking mechanism 8 may be employed to determine the carrier frequency under conditions of carrier drift. One method which is effective for tracking the carrier frequency of some signals is to find the peak in the power spectrum within some range of the designated center-point frequency 7. The frequency of this peak is output at 9 as the true center-point frequency of the signal. There are many digital modulation schemes wherein the carrier is substantially suppressed. These types of signals, however, usually exhibit strong spectral peaks offset from the carrier by the bit rate or some other frequency related to the modulation type. For such signals, knowledge of the signal type may be incorporated into the signal tracking mechanism such that one or more of these spectral peaks are tracked with the center-point frequency determined from the location of the peaks and knowledge of the signal type.

From each frame of power spectra 6 an embodiment of the adaptive filter of the invention is created by the filter generation unit 10 making use of the center-point frequency 9. The class of filter is determined by the function used to generate the filter. For each element of a frame of power spectral data there is a corresponding frequency domain filter coefficient. The collection of filter coefficients for an embodiment of the adaptive filter shall be referred to as a filter frame. The filter generation unit 10 produces a filter frame for each frame of power spectra. Consistent with the novel idea of the invention, the function used to generate the filter coefficients depends on the values of the power elements nearest the coefficient in question and their mirror elements. To be more specific, let the elements of the frames of spectral data and filter coefficients be indexed by a common set of integers. Let q be the index for the element nearest the center-point frequency. If each group of elements required to generate the function consists of 2m+1 elements, then the $k^{th}$ filter coefficient H(k) can be expressed as $$H(k)=f(P(k-m), \ldots, P(k), \ldots, P(k+m), P(2q-k-m), \ldots, P(2q-k), \ldots, P(2q-k+m)),$$

where P(k) is the value of the $k^{th}$ power spectral element. Note that the centers of the two groups, k and 2q-k, are equidistant from the center-point frequency bin q for every coefficient H(k). In this fashion, the filter generation process takes advantage of the spectral symmetry of the signal centered at q.

There are many functions which can be constructed consistent with the idea of the invention. Filters created with such functions fall into two classes, symmetry-passing and symmetry-rejecting. An example of a function used to generate a symmetry-passing filter which imposes symmetry on the filtered power spectrum is $$H(k) = \min\left( \sqrt{\frac{P(2q-k)}{P(k)}} , 1.0 \right),$$

An example of a function used to generate a symmetry-passing filter similar to the one above, but based on a smoothed version of the power spectrum, yielding improved performance when the center-point frequency is not near the center of a bin, is $$H(k) = \min\left( \sqrt{\frac{P(2q-k-1)+P(2q-k)+P(2q-k+1)}{P(k-1)+P(k)+P(k+1)}} , 1.0 \right),$$

Another example of a function used to generate a symmetry-passing filter by attenuating all elements which do not meet a certain symmetry criterion is $$H(k) = \begin{cases} 1.0, & \alpha < \frac{P(2q-k)}{P(k)} < \frac{1}{\alpha} \\ 0.0, & \text{otherwise} \end{cases}$$

where $\alpha$ is the symmetry criterion, such as 0.8.

An example of a function used to generate a symmetry-rejecting filter which is equivalent to subtracting the first example of a symmetry-passing filter from unity is $$H(k) = 1.0 - \min\left( \sqrt{\frac{P(2q-k)}{P(k)}} , 1.0 \right),$$

Finally, an example of a function used to generate a symmetry-rejecting filter by subtracting a symmetry-passing filter from unity only when the power spectral element corresponding to the filter coefficient exceeds a threshold is $$H(k) = \begin{cases} 1.0 - \min\left( \sqrt{\frac{P(2q-k)}{P(k)}} , 1.0 \right), & P(k) > \beta \\ 1.0, & \text{otherwise} \end{cases}$$

where $\beta$ is the threshold.

Note that although the example functions shown here are functions of the power spectral elements, they could, by extension, be written just as easily as functions of the amplitude spectral elements.

It should be clear that the variety of functions which could be used to generate either class of filter is great. The symmetry-passing filters tend to pass primarily the signal centered at the center-point frequency; so, the carrier of the SOI should be designated. The symmetry-rejecting filters tend to attenuate the signal centered at the center-point frequency; so, the carrier of an interferer should be designated.

Once the filter frame has been generated by the filter generation unit 10, it is applied to the signal in the frequency domain via multiplication in the multiplier unit 4. Note that each filter frame is multiplied with the frame of amplitude spectra corresponding to the frame of power spectra from which it was created.

Figure 3:
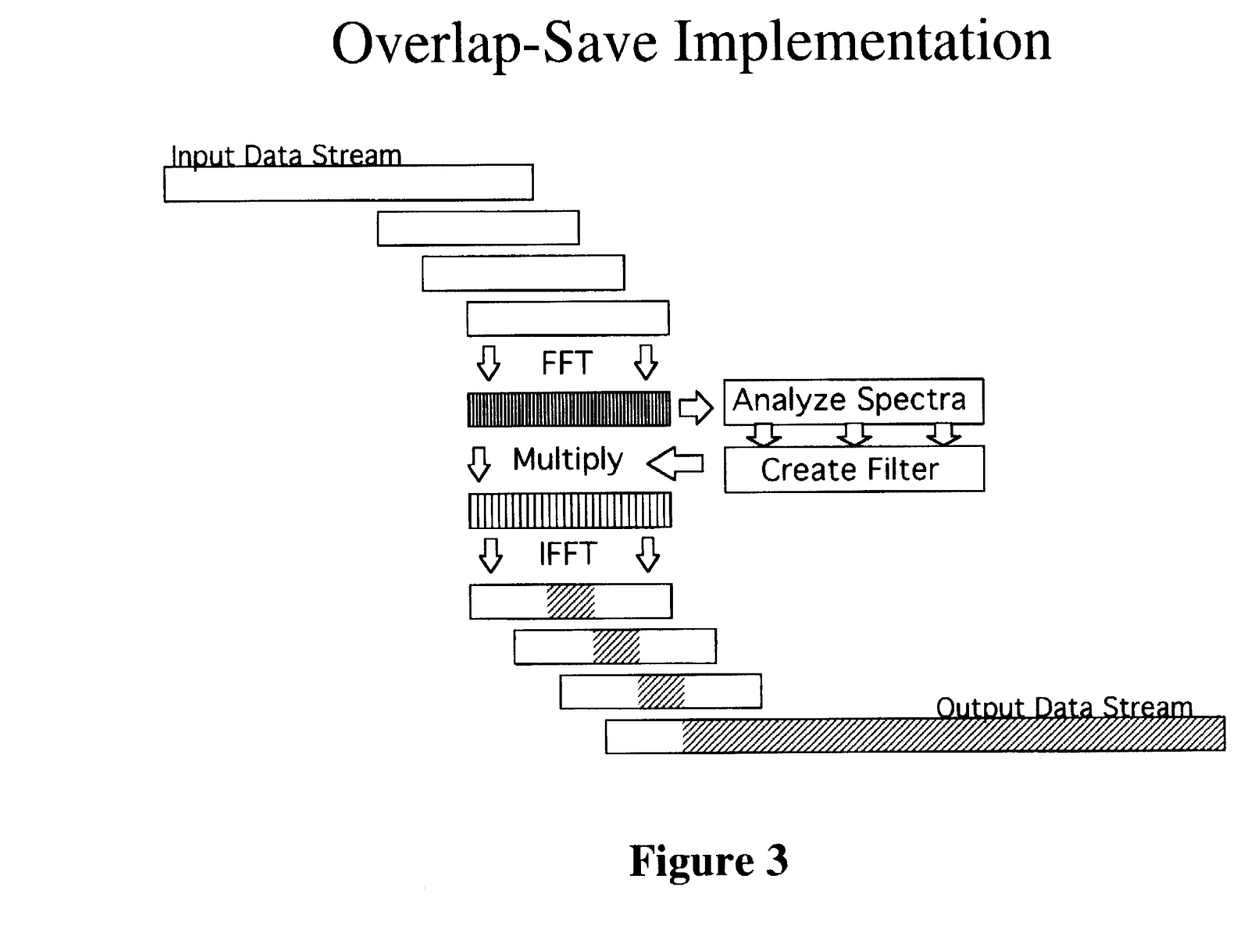
FIG. 3 is an illustration depicting the partitioning of input data into processing blocks, the transformation of the data to the frequency domain where the filtering takes place, the subsequent transformation back to the time domain, and finally reconstruction of the digital signal according to the overlap-save implementation of the preferred embodiment of the invention.

The resulting frames of filtered amplitude spectra 12 are transformed back to the time domain by the inverse transform unit 13. For each frame of filtered spectra a block of filtered time domain data is generated. The series of filtered data blocks overlap in time, but not all of the data are valid. A number of samples equal to half the length of the overlap must be discarded from each end of each filtered block. The window used in the forward transform is removed from the valid portion of each filtered block by dividing by the corresponding portion of the windowing function. The truncated data blocks are then concatenated to form the filtered output signal R. The partitioning of the input signal into blocks, transformation to the frequency domain, creation and application of the filter, transformation back to the time domain and reconstruction of filtered signal are illustrated in FIG. 3.

An embodiment of the invention based on the overlap-add method of linear filtering, as opposed to the overlap-save method, would use the same block diagram of FIG. 1, wherein only the functions performed by the transform and inverse transform units require modification. The transform unit 2, instead of partitioning the data into overlapping blocks, would zero pad a series of non-overlapping blocks prior to transformation. The inverse transform unit 13, rather than discard overlapping portions of the filtered data blocks, would add them together. In this type of implementation windowing would not generally be used.

The frequency-domain resolution of the filter of the invention and its adaptation rate are parameters that can be adjusted by those skilled in the art to optimize performance or processing speed. For implementations of the invention which have sufficient processing power for the required input bandwidth, all processing can be performed in real time. A delay is introduced by the system equal to the size of the data block multiplied by the sample rate plus the processing time for a single block, plus the additional delays that may result from buffering. Alternatively, the system could be used to process recorded signals, where real time operation may not be a requirement.

Figure 4:
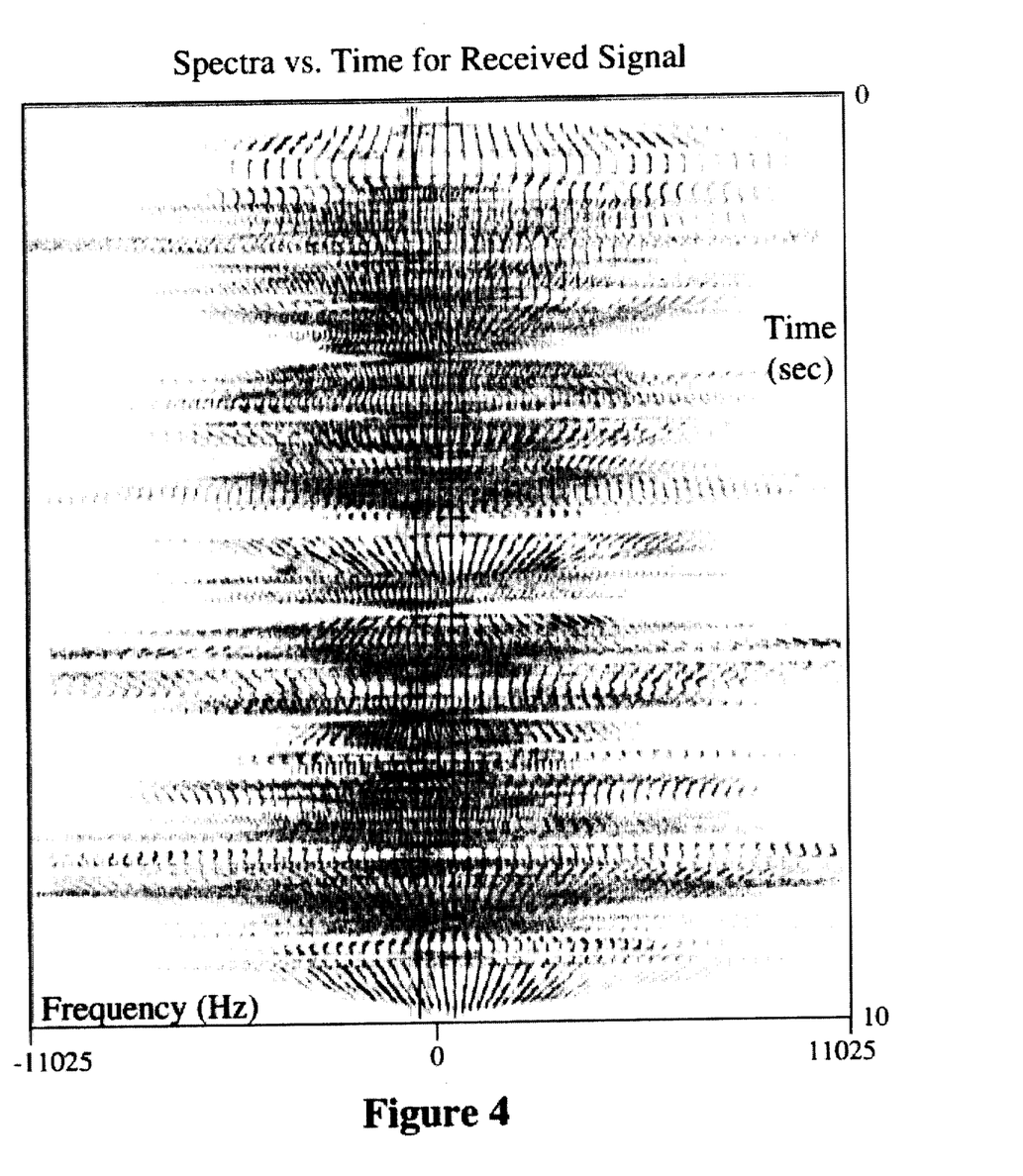
FIG. 4 is depiction of power spectra vs. time of a received signal containing a signal of interest and one interfering signal.
Figure 5:
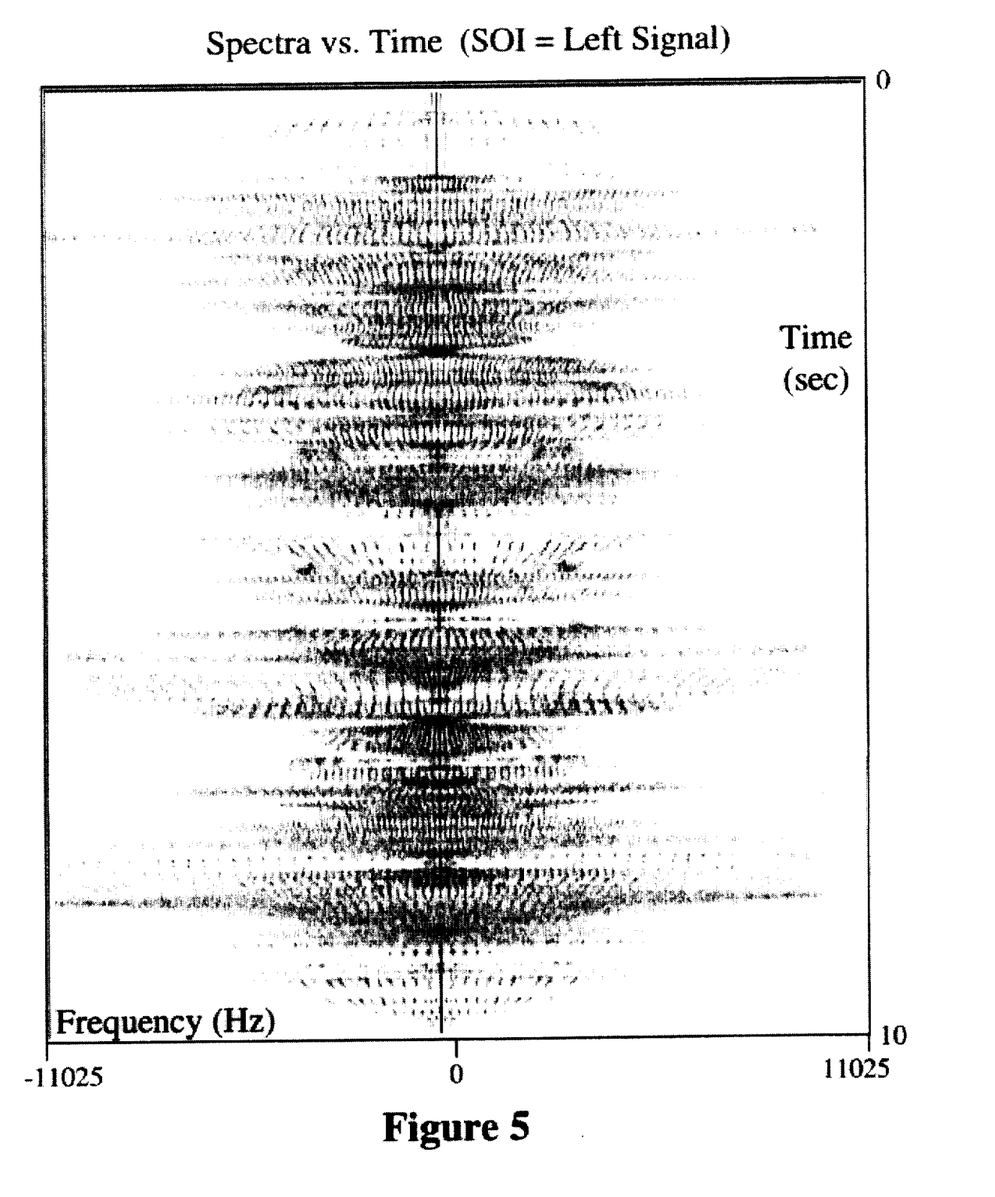
FIG. 5 is a depiction of power spectra vs. time of the signal of FIG. 4 after being filtered by a system constructed according to the invention. In this case the system was configured as a symmetrization filter and the signal on the left was considered to be the signal of interest.
Figure 6:
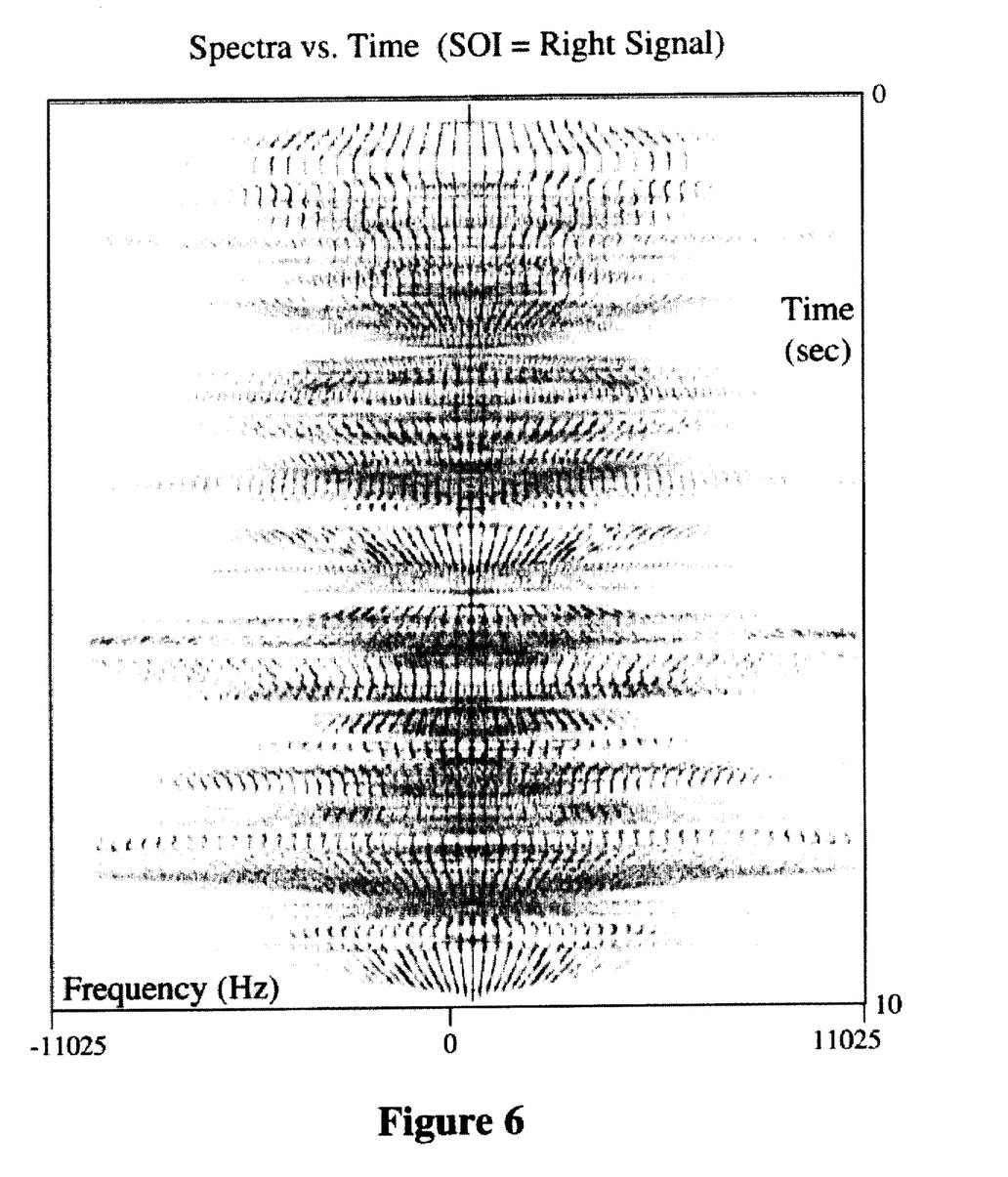
FIG. 6 is a depiction of power spectra vs. time of the signal of FIG. 4 after being filtered by a system constructed according to the invention. In this case the system was configured as a symmetrization filter and the signal on the right was considered to be the signal of interest.

It is understood that any of the computational units (2, 4, 5, 8, 10 and 13) may be implemented in software on a general purpose computer or in special purpose hardware. FIGS. 4, 5 and 6 illustrate the performance of a system based on the preferred embodiment of the invention. FIG. 4 depicts the power spectra vs. time for an input signal consisting of a signal of interest and a co-channel interferer. For purposes of illustration it is arbitrary which signal is considered the signal of interest. FIG. 5 depicts the power spectra vs. time of the output signal after being processed by the invention configured to implement a symmetry-passing filter where the signal on the left was designated as the signal of interest. FIG. 6 depict the power spectra vs. time of the output signal after being processed by the invention configured to implement a symmetry-passing filter where the signal on the right was designated as the signal of interest. Apparent in these illustrations is the substantial symmetry exhibited in the power spectra of the two signals about their respective carriers.

Figure 2:
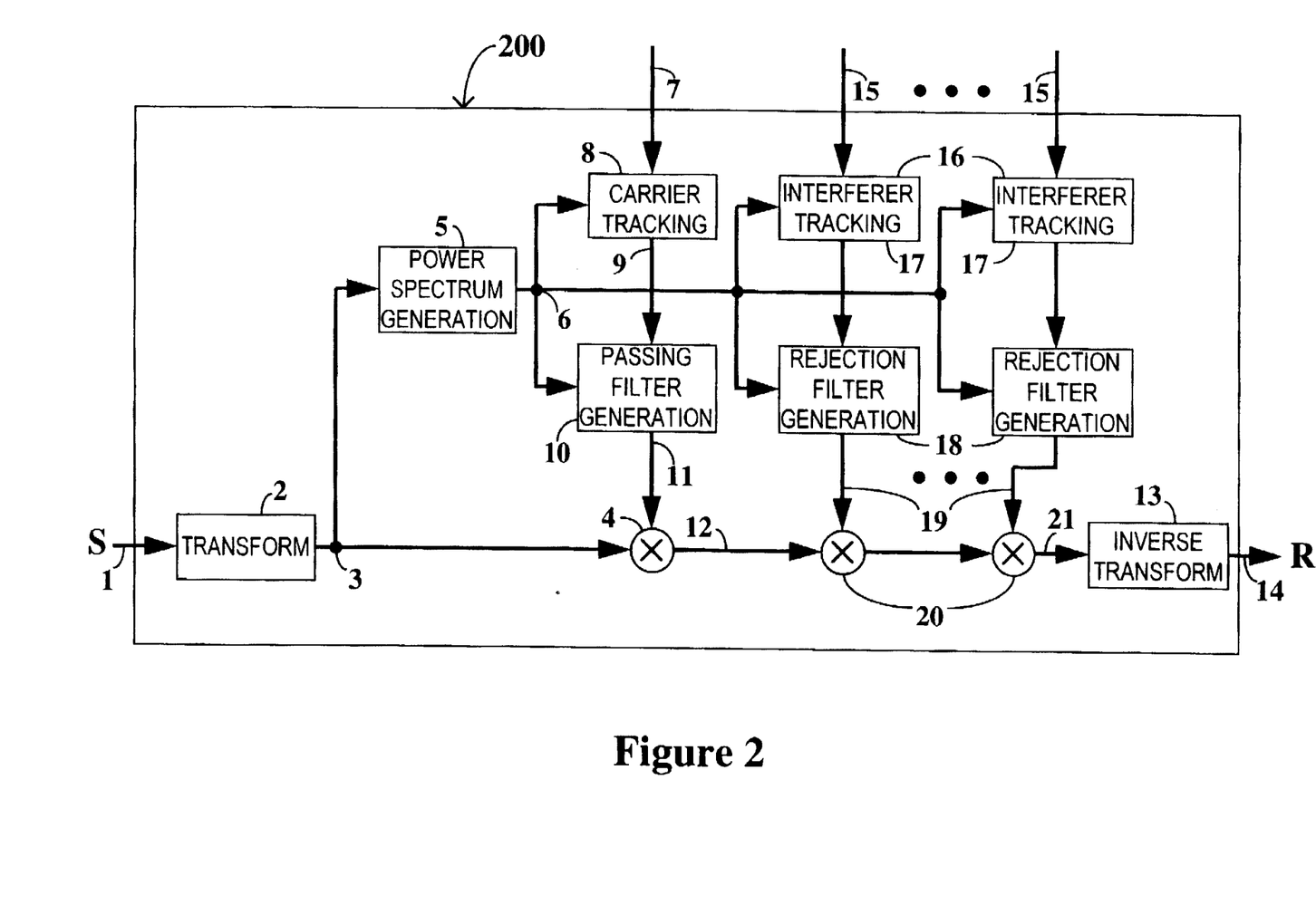
FIG. 2 is a block diagram of the preferred embodiment of a general implementation of the invention employing a cascade of a symmetry-passing filter centered at the SOI carrier frequency and a plurality of symmetry-rejection filters centered on the interfering carrier frequencies.

FIG. 2 illustrates an embodiment of the invention 200 that includes the additional units necessary for implementing a composite filter which is made up of a symmetry-passing filter centered on the SOI in conjunction with one or more symmetry-rejecting filters centered on one or more interferers. Additional center-point frequency terminals 15 are used to designate the carrier frequencies of specific interferers. Additional tracking mechanisms 16 are used to track each of the interfering signals. Additional filter generation units 18 are used to create symmetry-rejecting filters that will attenuate the designated interferers. The additional filter frames 19 are applied to the signal in cascade via the additional multiplier units 20. The composite filtered signal 21 is transformed back to the time domain as in the previous embodiment.

The present invention is general in purpose, does not suffer many of the disadvantages or limitations of techniques of the prior art, and has proven to be very effective at mitigating the effect of interferers separated from the SOI by as few as 100 Hz. The invention does not require that the interferers be of the same type as the SOI. The filter can be applied to all signals that exhibit a high degree of short-term spectral symmetry. This includes double side-band AM and most narrow-band analog and digital FM signals. The choice of SOI is not limited to the strongest signal in the channel but may be any signal of reasonable power relative to the interference. A sudden change in the number of interferers in the channel does not disrupt performance of the invention.

Various changes in the details, steps and components that have been described may be made by those skilled in the art within the principles and scope of the invention herein illustrated and defined in the appended claims.

While the present invention which has been shown and described herein is believed to be of the most practical and preferred embodiments, it is recognized that departures can be made therefrom within the scope of the invention, which is not limited to the details disclosed herein but is to be accorded the full scope of the claims so as to embrace any and all equivalent processes and apparatus.

What I claim is:

1. In a system comprising means for generating a series of power spectra from time-domain input data and means for designating a center-point frequency, an adaptive-filter generation unit comprising:

means for computing an adaptive filter composed of filter frames based on said power spectra relative to said center-point frequency, wherein each filter frame comprises a set of frequency-domain filter coefficients, each coefficient being a function of a first group of power spectral elements and a second group of power spectral elements, the first group of power spectral elements corresponding to a set of frequencies containing a frequency corresponding to said coefficient and the second group of power spectral elements consisting of mirror elements of said first group; and means for applying said adaptive filter to said input data;

wherein each of said first and second groups of power spectral elements comprises at least one power spectral element.

2. The system of claim 1, wherein said adaptive filter consists of a symmetry-passing filter adapted to produce symmetry in said power spectra about said designated center-point frequency.

3. The system of claim 2, wherein said symmetry-passing filter adapted to produce symmetry in said power spectra about said designated center-point frequency consists of the following rule:

$$H(k) = \min\left( \sqrt{\frac{P(2q-k-1) + P(2q-k) + P(2q-k+1)}{P(k-1) + P(k) + P(k+1)}}, 1.0 \right),$$

where k is an index corresponding to a frequency bin of said power spectra; q is an index corresponding of the center-point frequency; P(k) is a power spectrum element corresponding to the frequency bin having index k; P(2q–k) is the mirror power-spectrum element of P(k); and H(k) is a filter coefficient corresponding to said frequency bin.

4. The system of claim 2, wherein said symmetry-passing filter adapted to produce symmetry in said power spectra about said designated center-point frequency consists of the following rule:

$$H(k) = \min\left( \sqrt{\frac{P(2q-k)}{P(k)}}, 1.0 \right),$$

where k is an index corresponding to a frequency bin of said power spectra; q is an index corresponding of the center-point frequency; P(k) is a power spectrum element corresponding to the frequency bin having index k; P(2q–k) is the mirror power-spectrum element of P(k); and H(k) is a filter coefficient corresponding to said frequency bin.

5. The system of claim 2, wherein said symmetry-passing filter adapted to produce symmetry in said power spectra about said designated center-point frequency consists of the following rule:

$$H(k) = \begin{cases} 1.0, & \alpha < \frac{P(2q-k)}{P(k)} < \frac{1}{\alpha} \\ 0.0, & \text{otherwise} \end{cases}$$

where k is an index corresponding to a frequency bin of said power spectra; q is an index corresponding of the center-point frequency; P(k) is a power spectrum element corresponding to the frequency bin having index k; P(2q–k) is the mirror power-spectrum element of P(k); $\alpha$ is a symmetry criterion; and H(k) is a filter coefficient corresponding to said frequency bin.

6. The system of claim 2, wherein said means for applying said adaptive filter to said input data consists of a time-domain multiplication module.

7. The system of claim 2, wherein said means for designating a center-point frequency consists of a frequency tracking mechanism.

8. The system of claim 2, wherein said means for generating a series of power spectra from time-domain input data comprises a fast Fourier transformer for generating frequency-domain amplitude spectra and a squaring-function unit for generating power spectra corresponding thereto.

9. The system of claim 8, wherein said means for applying said adaptive filter consists of a multiplication module applied to said amplitude spectra in the frequency domain, thereby producing filtered frequency-domain amplitude spectra corresponding to said input data.

10. The system of claim 9, further comprising inverse-fast-Fourier-transformer means for transforming said filtered frequency-domain amplitude spectra into time-domain output data.

11. The system of claim 1, wherein said adaptive filter consists of a symmetry-rejection filter adapted to attenuate symmetry about a carrier frequency of an interferer in said power spectra.

12. The system of claim 11, wherein said symmetry-rejection filter adapted to attenuate symmetry about a carrier frequency of an interferer in said power spectra consists of the following rule:

$$H(k) = 1.0 - \min\left(\sqrt{\frac{P(2q-k)}{P(k)}}, 1.0\right),$$

where k is an index corresponding to a frequency bin of said power spectra; q is an index corresponding of the center-point frequency; P(k) is a power spectrum element corresponding to the frequency bin having index k; P(2q–k) is the mirror power-spectrum element of P(k); and H(k) is a filter coefficient corresponding to said frequency bin.

13. The system of claim 11, wherein said symmetry-rejection filter adapted to attenuate symmetry about a carrier frequency of an interferer in said power spectra consists of the following rule:

$$H(k) = \begin{cases} 1.0 - \min\left(\sqrt{\frac{P(2q-k)}{P(k)}}, 1.0\right), & P(k) > \beta, \\ 1.0, & \text{otherwise} \end{cases}$$

where k is an index corresponding to a frequency bin of said power spectra; q is an index corresponding of the center-point frequency; P(k) is a power spectrum element corresponding to the frequency bin having index k; P(2q–k) is the mirror power-spectrum element of P(k); $\beta$ is a threshold; and H(k) is a filter coefficient corresponding to said frequency bin.

14. The system of claim 1, wherein said means for applying said adaptive filter to said input data consists of a time-domain multiplication module.

15. The system of claim 1, wherein said means for designating a center-point frequency consists of a frequency tracking mechanism.

16. The system of claim 1, wherein said means for generating a series of power spectra from time-domain input data comprises a fast Fourier transformer for generating frequency-domain amplitude spectra and a squaring-function unit for generating power spectra corresponding thereto.

17. The system of claim 16, wherein said means for applying said adaptive filter consists of a multiplication module applied to said amplitude spectra in the frequency domain, thereby producing filtered frequency-domain amplitude spectra corresponding to said input data.

18. The system of claim 17, further comprising inverse-fast-Fourier-transformer means for transforming said filtered frequency-domain amplitude spectra into time-domain output data.

19. In a system comprising means for generating a series of power spectra from time-domain input data and means for designating a center-point frequency, an adaptive-filter generation unit comprising:

means for computing an adaptive filter composed of filter frames based on said power spectra relative to said center-point frequency, wherein each filter frame comprises a set of frequency-domain filter coefficients, each coefficient being a function of a first group of power spectral elements and a second group of power spectral elements the first group of power spectral elements corresponding to a set of frequencies containing a frequency corresponding to said coefficient and the second group of power spectral elements consisting of mirror elements of said first group; and means for applying said adaptive filter to said input data;

wherein each of said first and second groups of power spectral elements comprises at least one power spectral element; and wherein said adaptive filter consists of a symmetry-passing filter adapted to produce symmetry in said power spectra about said designated center-point frequency, said symmetry-passing filter being cascaded with at least one symmetry-rejection filter adapted to attenuate symmetry about a carrier frequency of an interferer in said power spectra.

20. The system of claim 19, wherein said symmetry-passing filter adapted to produce symmetry in said power spectra about said designated center-point frequency consists of the following rule:

$$H(k) = \min\left(\sqrt{\frac{P(2q-k-1)+P(2q-k)+P(2q-k+1)}{P(k-1)+P(k)+P(k+1)}}, 1.0\right),$$

where k is an index corresponding to a frequency bin of said power spectra; q is an index corresponding of the center-point frequency; P(k) is a power spectrum element corresponding to the frequency bin having index k; P(2q–k) is the mirror power-spectrum element of P(k); and H(k) is a filter coefficient corresponding to said frequency bin.

21. The system of claim 19, wherein said symmetry-passing filter adapted to produce symmetry in said power spectra about said designated center-point frequency consists of the following rule:

$$H(k) = \min\left(\sqrt{\frac{P(2q-k)}{P(k)}}, 1.0\right),$$

where k is an index corresponding to a frequency bin of said power spectra; q is an index corresponding of the center-point frequency; P(k) is a power spectrum element corresponding to the frequency bin having index k; P(2q–k) is the mirror power-spectrum element of P(k); and H(k) is a filter coefficient corresponding to said frequency bin.

22. The system of claim 19, wherein said symmetry-passing filter adapted to produce symmetry in said power spectra about said designated center-point frequency consists of the following rule:

$$H(k) = \begin{cases} 1.0, & \alpha < \frac{P(2q-k)}{P(k)} < \frac{1}{\alpha}, \\ 0.0, & \text{otherwise} \end{cases}$$

where k is an index corresponding to a frequency bin of said power spectra; q is an index corresponding of the center-point frequency; P(k) is a power spectrum element corresponding to the frequency bin having index k; P(2q–k) is the mirror power-spectrum element of P(k); a is a symmetry criterion; and H(k) is a filter coefficient corresponding to said frequency bin.

23. The system of claim 19, wherein said symmetry-rejection filter adapted to attenuate symmetry about a carrier frequency of an interferer in said power spectra consists of the following rule:

$$H(k) = 1.0 - \min\left(\sqrt{\frac{P(2q-k)}{P(k)}}, 1.0\right),$$

where k is an index corresponding to a frequency bin of said power spectra; q is an index corresponding of the center-point frequency; P(k) is a power spectrum element corresponding to the frequency bin having index k; P(2q–k) is the mirror power-spectrum element of P(k); and H(k) is a filter coefficient corresponding to said frequency bin.

24. The system of claim 19, wherein said symmetry-rejection filter adapted to attenuate symmetry about a carrier frequency of an interferer in said power spectra consists of the following rule:

$$H(k) = \begin{cases} 1.0 - \min\left(\sqrt{\frac{P(2q-k)}{P(k)}}, 1.0\right), & P(k) > \beta, \\ 1.0, & \text{otherwise} \end{cases}$$

where k is an index corresponding to a frequency bin of said power spectra: q is an index corresponding of the center-point frequency; P(k) is a power spectrum element corresponding to the frequency bin having index k; P(2q–k) is the mirror power-spectrum element of P(k); $\beta$ is a threshold; and H(k) is a filter coefficient corresponding to said frequency bin.

25. The system of claim 19, wherein said means for applying said adaptive filter to said input data consists of a time-domain multiplication module.

26. The system of claim 19, wherein said means for designating a center-point frequency consists of a first frequency tracking mechanism; and wherein said carrier frequency of an interferer is designated by an additional frequency tracking mechanism.

27. The system of claim 19, wherein said means for generating a series of power spectra from time-domain input data comprises a fast Fourier transformer for generating frequency-domain amplitude spectra and a squaring-function unit for generating power spectra corresponding thereto.

28. The system of claim 27, wherein said means for applying said adaptive filter consists of multiplication modules corresponding to said symmetry-passing and said symmetry-rejection filters applied to said amplitude spectra in the frequency domain, thereby producing filtered frequency-domain amplitude spectra corresponding to said input data.

29. The system of claim 28, further comprising inverse-fast-Fourier-transformer means for transforming said filtered frequency-domain amplitude spectra into time-domain output data.

* * * * *

UNITED STATES PATENT AND TRADEMARK OFFICE
CERTIFICATE OF CORRECTION

PATENT NO. : 5,757,684
DATED : May 26, 1998
INVENTOR(S) : Thomas C. Zaugg

It is certified that error appears in the above-indentified patent and that said Letters Patent is hereby corrected as shown below:

In Claim 21, column 11, line 28, before the word "is" replace the word "a" with --$\alpha$--.

Signed and Sealed this

Eighteenth Day of August, 1998

Attest:

Attesting Officer

BRUCE LEHMAN

Commissioner of Patents and Trademarks